TRANSDUCER WITH THIN FILM COIL AND SEMICONDUCTOR SWITCHING

Filed Dec. 16, 1966 4 Sheets-Sheet 1

INVENTOR
WILLIAM W. STEVENS JR
BY Flehr, Hohbach, Test, Albritton & Herbert
ATTORNEYS Feb. 16, 1971 W. W. STEVENS, JR 3,564,522

TRANSDUCER WITH THIN FILM COIL AND SEMICONDUCTOR SWITCHING

Filed Dec. 16, 1966 4 Sheets-Sheet 2

INVENTOR
WILLIAM W. STEVENS JR.
BY Fleh, Hohbach, Test, Albritton & Herbert
ATTORNEYS

TRANSDUCER WITH THIN FILM COIL AND SEMICONDUCTOR SWITCHING

Filed Dec. 16, 1966 4 Sheets-Sheet 3

INVENTOR
WILLIAM W. STEVENS JR.
BY Flehr, Hohbach, Test, Albritton & Herbert
ATTORNEYS

TRANSDUCER WITH THIN FILM COIL AND SEMICONDUCTOR SWITCHING

Filed Dec. 16, 1966 4 Sheets-Sheet 4

INVENTOR
WILLIAM W. STEVENS JR.
BY Fleh, Hohbach, Test, Albritton & Herbert
ATTORNEYS United States Patent Office 3,564,522

Patented Feb. 16, 1971

3,564,522

TRANSDUCER WITH THIN FILM COIL AND SEMICONDUCTOR SWITCHING

William W. Stevens, Jr., Atherton, Calif., assignor to Data-Disc, Incorporated, Palo Alto, Calif., a corporation of Nevada Filed Dec. 16, 1966, Ser. No. 602,212
Int. Cl. G11b *5/20, 5/42*
U.S. Cl. 340—174.1 12 Claims

ABSTRACT OF THE DISCLOSURE

A magnetic transducer having a thin, flexible member which carries and supports transducer windings and a core of magnetic material carried by the member in coupled relationship to said windings.

This invention relates generally to a magnetic head assembly and method of manufacture and more particularly to a magnetic head array and method of manufacturing the same.

Present day magnetic heads or transducers employ a core of magnetic material which is arranged to define a recording gap. One or more windings are associated with the core whereby to be linked with the magnetic fields in the core. The windings are either wound directly onto the core or they are wound onto bobbins which are applied to the core. The complete assembly is then placed in a support for supporting the transducer in cooperative relationship with an associated recording medium. The steps in the manufacture of such transducers are rather complex, and a large amount of labor is involved.

Magnetic heads may be supported and arranged in arrays whereby to form multiple tracks in longitudinal, disc or drum recording mediums. Such arrays are difficult to support to cooperate with the recording medium. The number of transducers in an array of a given size is limited by the size of the transducers.

When multiple heads or transducer arrays are employed, switching circuits employing diodes and transistors select a particular head to record or reproduce from a particular track. This requires that at least a pair and often three leads extend from each head to the switching circuit. The number of heads determines the number of leads in a bundle leading from the multiple heads. Special precautions are necessary to electrically isolate the leads. As the number of heads is increased, the complexity of the electrical connections increases.

To overcome the connection difficulties discussed above and to reduce the cost by employing only one transducer, apparatus has been designed in which the transducer is moved from one track to the next. However, the mounting is rather complex. Further, the access time becomes long making such a system unsatisfactory for many applications.

It is a general object of the present invention to provide an improved magnetic head assembly.

It is a further object of the present invention to provide an improved method for manufacturing magnetic heads.

It is still a further object of the present invention to provide a new and improved multiple magnetic head assembly and method of manufacturing the same.

It is another object of the present invention to provide a multiple magnetic head assembly which includes switching elements.

It is still a further object of the present invention to provide a magnetic head array including a support for independently supporting the coils and cores.

It is still a further object of the present invention to provide a magnetic head array in which the coils are in the form of thin films.

It is still a further object of the present invention to provide a magnetic head array of the type described above in which a semiconductor sheet serves to carry thin film coils and cores and which includes semiconductor switching devices.

The foregoing and other objects of the invention will become more clearly apparent from the following description taken in conjunction with the accompanying drawing.

Referring to the drawing.

Figure 1:
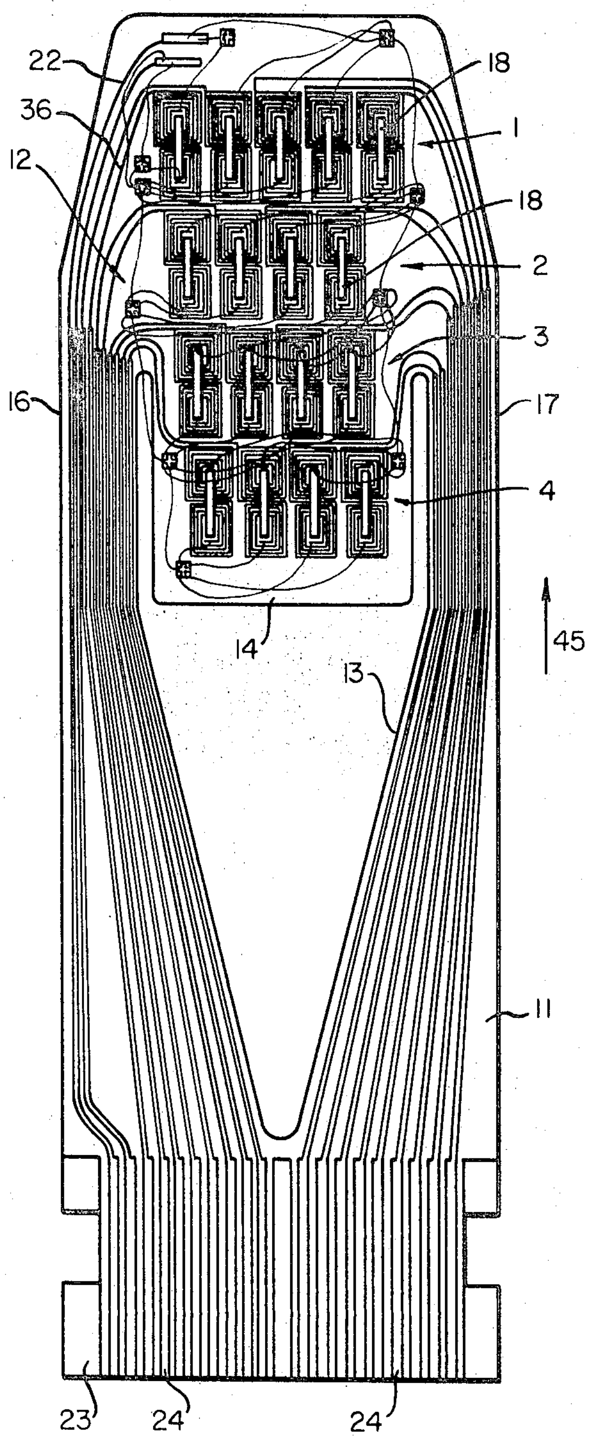
FIG. 1 is a plan view of a multiple head array in accordance with the invention.

Referring to FIGS. 1–4, there is shown a substrate 11 which forms the support for the magnetic head or transducer array designated generally by the reference numeral 12. The substrate 11 is in the form of an elongated card having a cut-out portion 13 to define a head mount portion 14 which is supported between spaced arms 16 and 17. As will be described, the substrate is preferably formed from a wafer of semiconductor material, silicon or germanium; however, it will become apparent that the support 11 may be any thin flexible material, either conductive or non-conductive, and provided with an insulated coating.

A plurality of pairs of spaced holes 18 are formed in the substrate 11. These holes may be arranged in a plurality of rows. In the example, there are shown four rows numbered 1–4. These serve to receive the cores 19 of the individual magnetic heads. The spaced holes may be formed by masking and etching techniques, well known in the metal and semiconductor arts.

The substrate carries a conductive pattern formed by conventional thin film techniques such as metallizing and selectively etching to form the desired pattern. The conductive pattern includes a plurality of spiral coils 21, one surrounding each of the openings formed in the substrate. The outer convolutions of the coils of adjacent pairs of spaced holes are connected to one another to form a center tap connection. The center tap is connected to conductors 22 which extend downwardly along the arms of the substrate towards the rear support 23 to form a plurality of parallel metal tab portions 24 adapted to interfit into an associated socket for making electrical connection to the outer convolution of each of the plurality of coils 21. The coils of the upper row are connected to leads 22–1–1 through 22–1–4 corresponding to the four heads in the row. The outer convolutions of the coils in rows 2–4 are connected to leads 22–2–1 through 22–2–4, 22–3–1 through 22–3–4, and 22–4–1 through 22–4–4, respectively.

Figure 2:
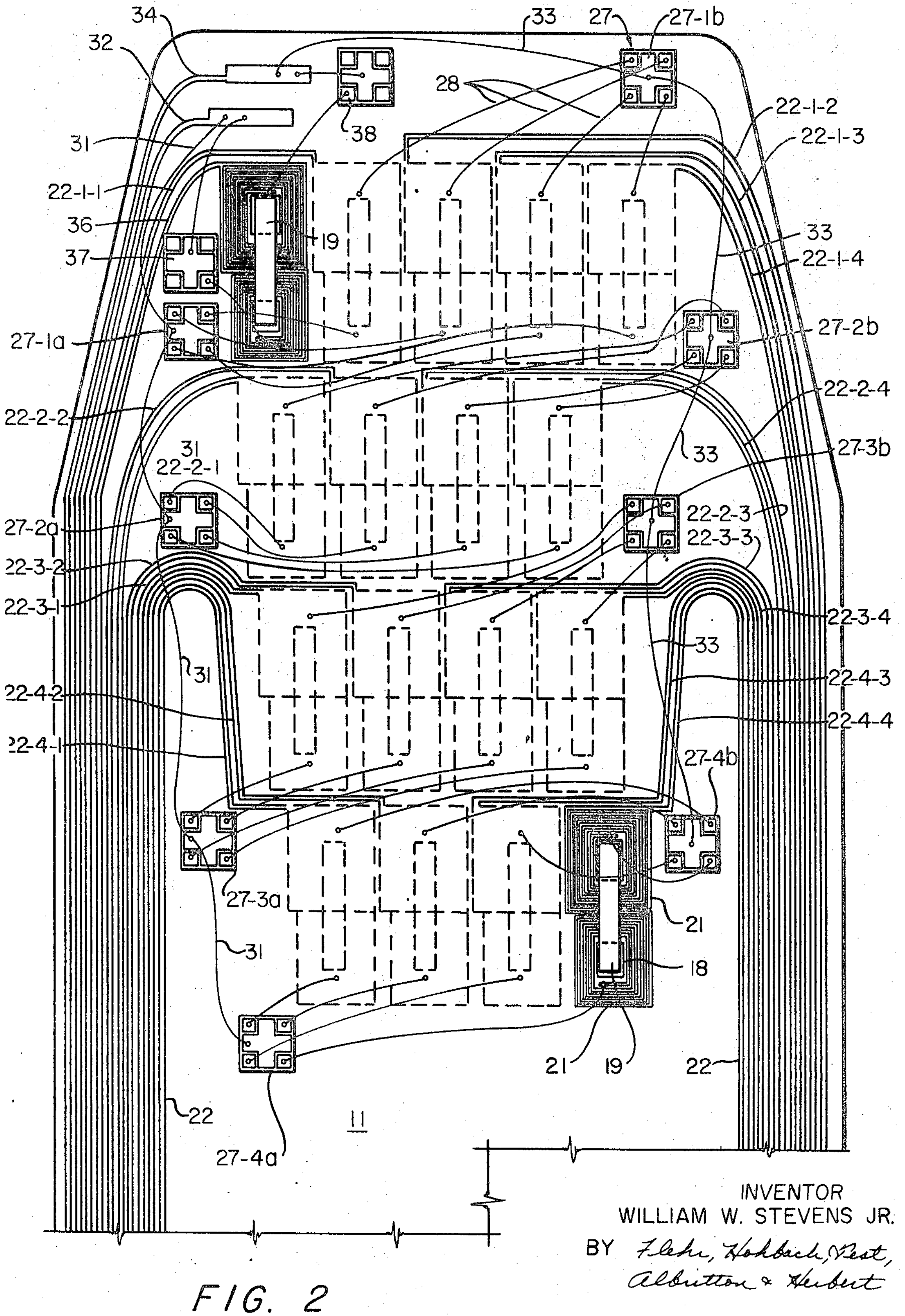
FIG. 2 is an enlarged view of a portion of the array shown in FIG. 1.

Referring more specifically to FIG. 2, the inner convolution of each of the coils is connected to one terminal of each of the diodes in the diode assemblies 27 by leads 28. The diode assemblies shown are formed of a chip of semiconductor material which is supported on the substrate 11 and which includes four diodes having a common terminal. The cross forms the common terminal of the four diodes.

A diode assembly **27–1*a* has one terminal connected to each of the inner convolutions of the coil surrounding the lower holes in the first or upper right-hand row of transducers. The inner convolution of each of the coils surrounding the upper holes of the same transducers is connected to one terminal of diode assembly 27–1*b***. The connection of the common diode terminal will be presently described.

Similarly, diode assemblies **27–2*a*, 27–3*a* and 27–4*a* are connected to the inner convolution of the lower coils of the other rows of transducers. The upper coils of the transducer rows are connected to diode assemblies 27–2*b*, 27–3*b* and 27–4*b***.

The common terminal of the diode assemblies **27–1*a*, 27–2*a*, 27–3*a* and 27–4*a* is interconnected by a common lead 31 to output conductor 32. The common terminal of diode assemblies 27–1*b*, 27–2*b*, 27–3*b* and 27–4*b* is interconnected by common lead 33 to the output conductor 34**.

Row 1 includes a fifth pair of holes and coils. The center tap or outer convolution is connected to conductor 36. The inner convolution of the lower coil is connected to one terminal of a diode 37 while the other terminal of the diode is connected to output conductor 32. The inner convolution of the upper coil is connected to one terminal of diode 38 while the other terminal of the diode is connected to conductor 34.

Thus, the substrate carries the switching diodes. Very short leads are required between the coils and the associated switching diodes and conductors. The complete switching matrix, to be presently described, is carried by the thin support along with all of its leads. The only leads extending to the outside world are the thin film leads or conductors carried by the substrate.

Figure 3:
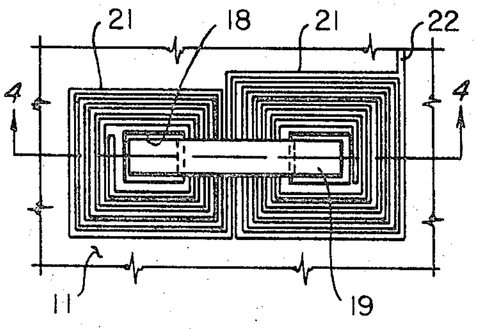
FIG. 3 is an enlarged view of one of the magnetic head assemblies in the array shown in FIGS. 1 and 2.
Figure 4:
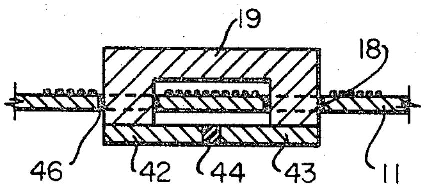
FIG. 4 is a sectional view taken along the line 4—4 of FIG. 3.

A U-shaped ferrite core 19 is associated with each of the pairs of holes in the array. The legs extend through the holes in the substrate to the other side of the substrate. Referring more particularly to FIGS. 3 and 4, an enlarged view of one of the magnetic head assemblies shows the core 19 extending through the holes in the substrate. Pole pieces 42 and 43 are affixed to the ends of the core legs and are spaced apart to define a recording gap 44. Preferably, the recording gap may be formed by bonding the pair of pole pieces 42 and 43 to one another by means of a non-magnetic bonding compound to assure that the gap is maintained while affixing them to the core legs. Techniques for forming accurate gaps in magnetic heads are well known in the art. The core 19 may be secured to the substrate by means of a suitable material such as epoxy 46 applied at the holes 18.

Thus, the complete head assembly is supported on the substrate with the coils and core independently supported. The semiconductor switching devices are also supported on the substrate whereby to shorten the length of the leads connected to the switching diodes and reduce the number of leads which must extend away from the multiple head array.

Figure 5:
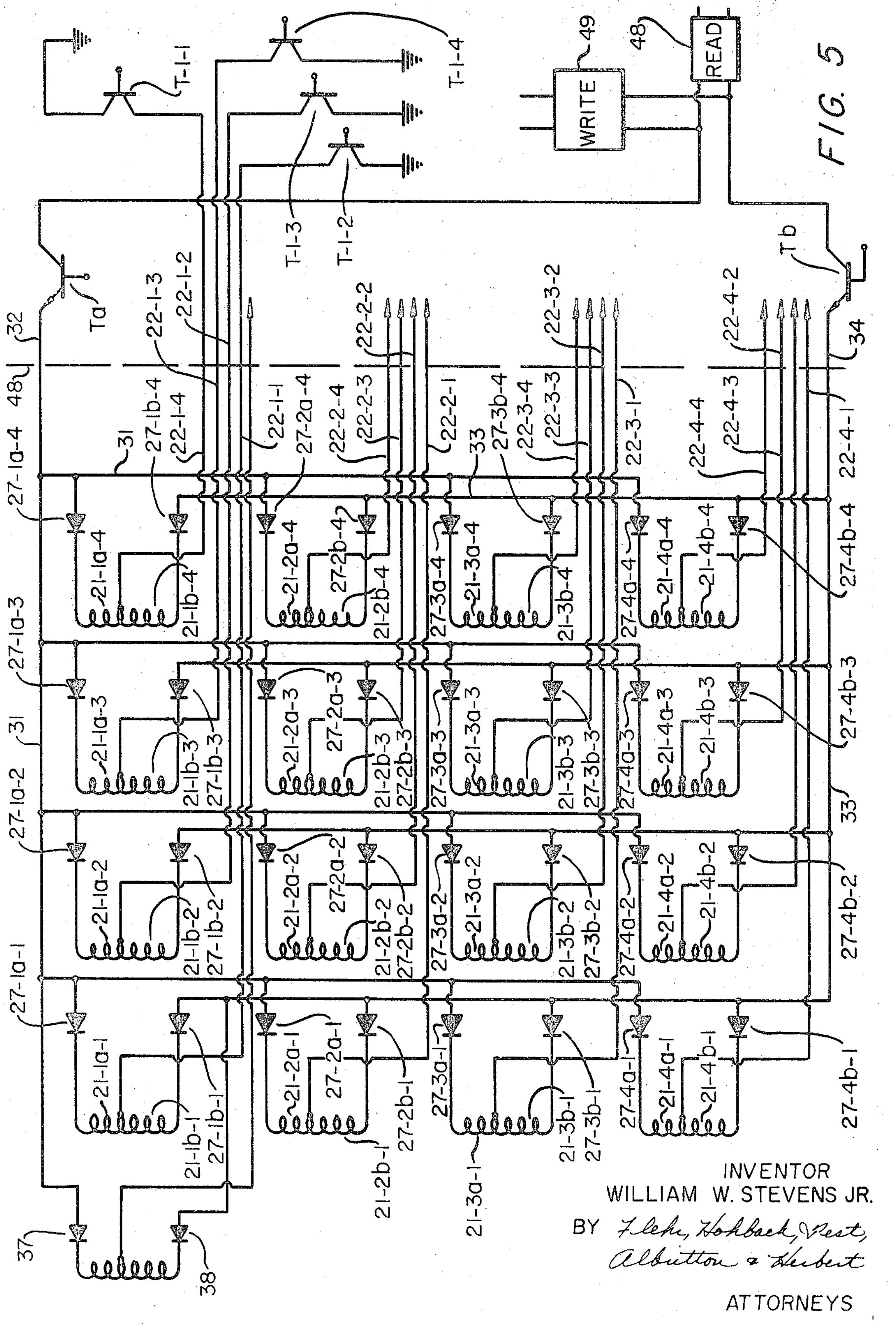
FIG. 5 shows the electronic switching circuitry associated with the magnetic head array of FIGS. 1 and 2.

The electrical circuit including coils and switching devices is shown in the circuit diagram of FIG. 5. The coil surrounding the lower holes in Row 1 is represented by reference numeral **21–1*a*** and the coil surrounding the upper holes is represented by the reference numeral

**21–1*b*. The individual coil pairs are designated by affixing numerals 1–4. Similar notation is employed for succeeding rows. The center tap leads and conductors were numbered above as 22–1–1 through 22–1–4, 22–2–1, etc. The inner convolution of each of the lower coils is connected to a diode in the diode groups 27–1*a*, 27–2*a*, 27–3*a*, 27–4*a*, respectively. The individual diodes are identified by affixing numerals 1–4. The inner convolution of each of the upper coils is connected to a diode in diode groups 27–1*b*, 27–2*b*, 27–3*b*, 27–4*b*, respectively. The individual diodes are identified by affixing the numerals 1–4. The diodes are interconnected by common leads 31 and 33 to conductors 32 and 34. The dashed line 48** represents the tab end of the substrate. The external circuit includes control transistors T*a* and T*b* for selecting the upper or lower winding in each row, and T–1–1, T–1–2, T–1–3, T–1–4 for selecting the transducer on the row. Additional transistors T–2–1 through T–2–4, T–3–1 through T–3–4 and T–4–1 through T–4–4 (not shown) are associated with the center tap of the heads in the other rows for selecting the same. Thus, all of the lower coils are placed in readiness by exciting transistor T*a*. A particular head is then selected by energizing one of the other transistors, for example, T–1–1, to select the lower winding **21–1*a*–1 and, similarly the upper winding 21–1*b*–1** is concurrently selected by exciting transistor T*b*. Read and write amplifiers 48 and 49 are connected to transistors T*a* and T*b*.

It is to be observed particularly that only 19 leads are required to extend from the seventeen transducer array in order to perform the switching operation. In the prior art, there would be, in addition to this number of leads, minus two, all of the leads which are the short leads connected to the respective diodes from the inner convolutions of the associated coils.

In the event that one of the heads should become inoperative for any reason, the fifth head in row 1 may be switched into the circuit to retain the complement of 16 heads.

It is observed that each row of heads is offset or staggered with respect to the adjacent row whereby the tracks formed by the heads are adjacent to one another. The magnetic medium would move in the direction indicated by arrow 45, FIGS. 1 and 2. If the recording medium is a disc, the gaps would be arranged to lie on axes of concentric circles. For a drum type recording medium, the gaps would lie on a surface defined by the surface of a cylinder.

Figure 6:
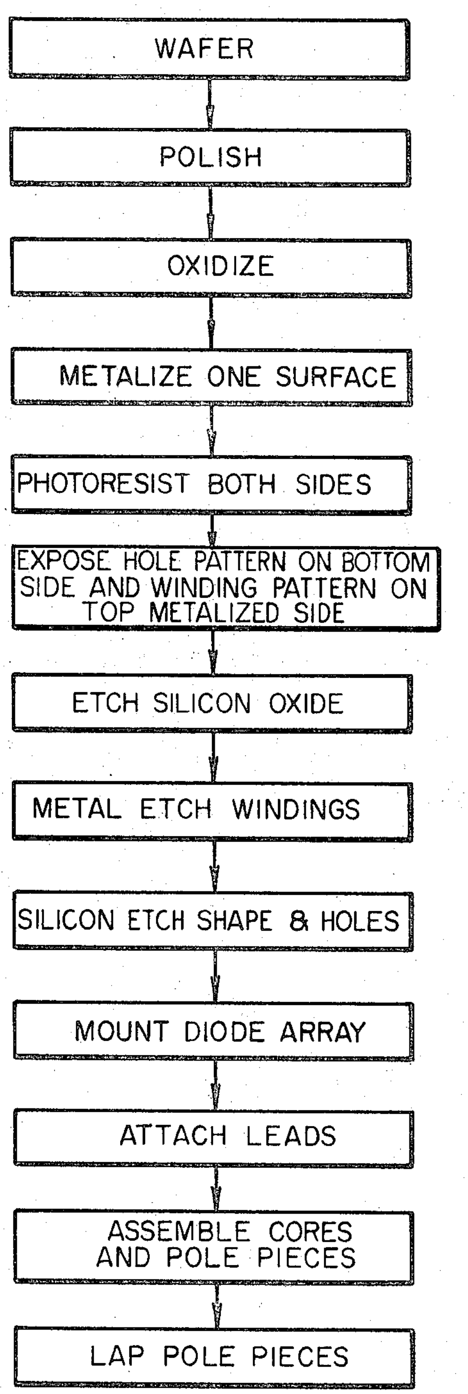
FIG. 6 shows the steps in forming a typical array in accordance with the present invention.

The following process is illustrative of the manufacture of a multiple head array in accordance with the present invention. The process is schematically illustrated in FIG. 6. The first step is to select a wafer of silicon material of suitable thickness and size. The wafer is polished as by lapping. Next, the wafer is oxidized by elevating its temperature in an oxygen-rich atmosphere, in accordance with well ksown techniques. A metal film or layer is applied over the oxide on one face of the device. This can be applied by plating, sputtering or evaporation techniques. Photoresist is then applied to both sides of the wafer over the metal layer and the oxide on the other face. The photoresist is selectively removed to expose silicon oxide at the hole pattern, the outline of the substrate 11, the cut-out portion 13, and the metal to be removed to leave coils.

The exposed silicon oxide is etched to expose the underlying silicon wafer. The exposed metal is then etched to leave the windings, followed by etching the exposed silicon to form the shape of the substrate 11, the cut-out portion 13, and the transducer holes 18. The diodes are mounted and leads bonded between the diodes and the windings.

The cores are then inserted in the openings and pole pieces applied. The complete array is then lapped to assure that the pole pieces lie in a common geometric surface—a plane for a disc or tape, or a cylindrical surface for a drum. The wafer is then plugged into an associated socket to make connections to the external equipment. The socket serves also to support the head array for cooperation with an associated recording medium.

Figure 7:
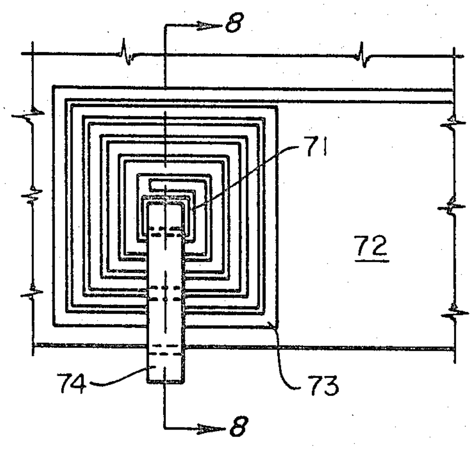
FIG. 7 is a partial view showing another magnetic head in accordance with the invention.

In the embodiment shown, a recording process was illustrated in which each of the magnetic heads was associated with a pair of holes. It is possible to provide a recording head in which a single coil is associated with a head. Such a head is shown in FIG. 7 wherein a single hole 71 formed in a wafer 72 has formed thereabout the coil 73. One leg of the core 74 extends through the hole and the other over the outer edge of the wafer.

Figure 9:
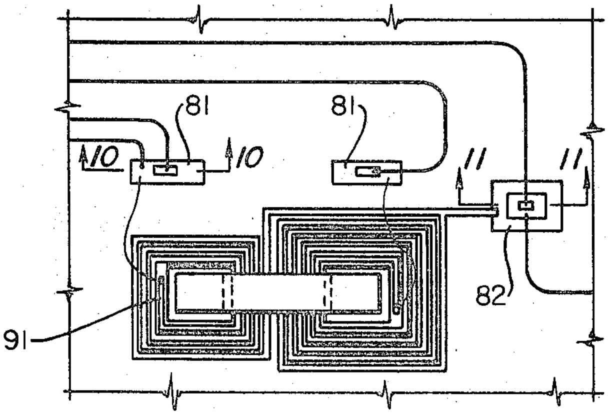
FIG. 9 is an enlarged partial view of a magnetic head in an array of the type shown in FIG. 1 in which switching devices are formed in a semiconductor support.
Figure 10:
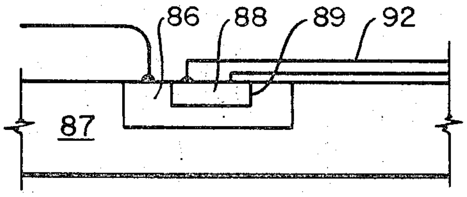
FIG. 10 is an enlarged sectional view taken along line 10—10 of FIG. 9.

As described above, the various semiconductor elements were individual elements affixed to the wafer itself. If a silicon or germanium wafer is employed, it is possible to form the diodes and transistors directly in the semiconductor wafer by techniques well known in the semiconductor art. Thus, in FIG. 9, there is shown planar diodes 81 and a planar transistor 82 formed directly in the semiconductor wafer. The diode is more clearly shown in FIG. 10 wherein the diode is formed by diffusing a first region 86 into the silicon substrate 87, and subsequently diffusing another inset region 88 which forms a rectifying junction 89. One of the inner convolutions shown at 91 is connected to one of the diode terminals, while an evaporated or metallized lead 92 is shown associated with the inner planar inset region 88.

Figure 11:
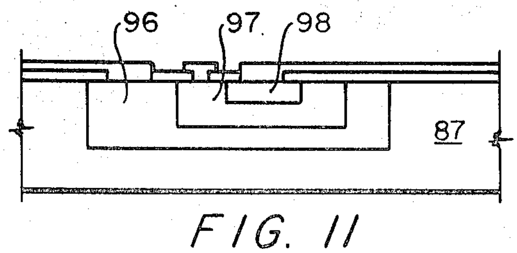
FIG. 11 is an enlarged sectional view taken along line 11—11 of FIG. 9.

In FIG. 11, there is shown the transistor which includes three inset regions of opposite conductivity type 96, 97 and 98 formed in the semiconductor wafer 87. Connections are shown made to the collector 96, to the base 97 and to the emitter 98, respectively. In this embodiment, the assembly includes the active devices associated with the switching and amplifying operation.

Figure 12:
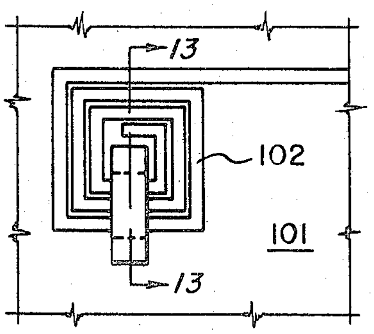
FIG. 12 is a partial view showing another transducer in accordance with the present invention.
Figure 8:
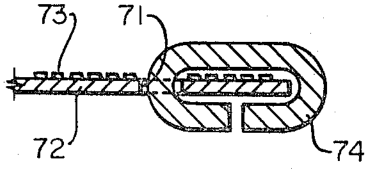
FIG. 8 is a sectional view taken along the line 8—8 of FIG. 7.
Figure 13:
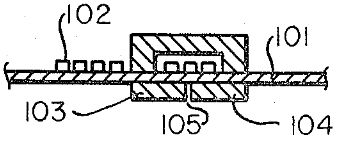
FIG. 13 is an enlarged sectional view taken along line 13—13 of FIG. 12.

With a very thin semiconductor substrate carrying windings, it is possible to fabricate a transducer which does not require holes through the substrate. Referring to FIGS. 12 and 13, there is shown a thin substrate 101 carrying a winding 102. A U-shaped core portion is coupled to the coil with its ends supported on one surface of the substrate. Pole pieces 103 and 104 having a gap 105 are disposed directly opposite the ends of the core. The magnetic path for the flux will then include the series reluctance of the gaps formed by the semiconductor substrate between the core and the pole pieces. Again, the complete assembly is supported by the substrate.

In summary then, there is provided a magnetic head array which employs techniques currently being used in the integrated and micro-circuit semiconductor art to manufacture magnetic heads. It is seen that the heads are made by simple processes. The coils are formed by well known thin film techniques which can be accurately controlled and in which the spacing can be accurately arranged. Mechanical problems are reduced to a minimum because of the assembly processes used.

I claim:

1. In a magnetic transducer of the type including a core of magnetic material, a thin member having first and second substantially parallel faces, at least one hole extending through said member, said member serving to receive and support said core with said core extending through said hole in a direction substantially perpendicular to said faces, and at least one winding formed to surround said hole carried and supported on one face of said member in coupled relationship with said core.

2. A magnetic transducer as in claim 1 wherein said member comprises a wafer of semiconductor material.

3. A magnetic transducer as in claim 1 wherein said winding is in the form of a spirally formed thin film conductor.

4. A magnetic transducer as in claim 1 wherein said core is U-shaped and disposed substantially on one side of said member and a keeper including a transducing gap is disposed on the other side of the member in magnetic cooperation with the ends of the core.

5. A magnetic transducer as in claim 4 wherein said support includes two spaced holes for receiving said core and said keeper is in physical contact with the ends of the core.

6. In a magnetic transducer, a plurality of cores of magnetic material, a thin member having first and second substantially parallel faces, a plurality of holes formed in said thin member in a predetermined pattern and serving to receive and support said cores with one of said cores extending through each of said holes in a direction substantially perpendicular to the face of the member and a plurality of windings carried and supported on the face of said member with at least one winding being in cooperative relationship with each of said holes to surround each of said holes and link with the core extending therethrough.

7. A magnetic transducer as in claim 6 in which said windings are in the form of spirally formed thin film conductors.

8. A magnetic transducer as in claim 7 wherein said cores are U-shaped and disposed substantially on one side of said member and a keeper including a transducing gap is disposed on the other side of the member in magnetic cooperation with the ends of the core.

9. A magnetic transducer as in claim 6 in which the transducers are selected by a diode matrix, the diodes forming the matrix being carried on said thin member with thin film conductors extended to the edge of the member for connection to associated apparatus.

10. A magnetic transducer as in claim 9 wherein said member comprises a wafer of semiconductor material.

11. In a magnetic transducer, a plurality of cores of magnetic material, a wafer of semiconductor material having first and second substantially parallel faces, an oxide coating carried on one face of said wafer, said wafer serving to support the cores in a predetermined array, a plurality of windings in the form of spirally disposed thin film conductors carried on said oxide with at least one winding being in cooperative relationship with each of said cores, and means including diodes for selectively connecting to a selected winding, said diodes being carried on said wafer.

12. A transducer as in claim 11 wherein said diodes are formed in said wafer.

References Cited

UNITED STATES PATENTS

| | | | |
|---|---|---|---|
| 3,323,116 | 5/1967 | Solyst | 340—174.1 |
| 3,373,247 | 3/1968 | Hyland | 179—100.2 |
| 3,344,237 | 9/1967 | Gregg | 179—100.2 |
| 3,349,382 | 10/1967 | Naylor et al. | 179—100.2 |
| 3,240,881 | 3/1966 | Oliver | 179—100.2 |
| 3,475,739 | 10/1969 | La Manna | 179—100.2 |

BERNARD KONICK, Primary Examiner

V. P. CANNEY, Assistant Examiner

U.S. Cl. X.R.

29—603; 179—100.2; 346—74